United States Patent [19]
Stahl

[11] 3,719,603
[45] March 6, 1973

[54] NOVEL LOW BOILING COMPOSITIONS

[75] Inventor: Richard F. Stahl, Madison, N.J.

[73] Assignee: Allied Chemical Corporation, New York, N.Y.

[22] Filed: Oct. 30, 1968

[21] Appl. No.: 771,998

[52] U.S. Cl. ....................252/67, 252/305, 252/66
[51] Int. Cl. ..............................C09k 3/02
[58] Field of Search...................252/67, 66

[56] References Cited

OTHER PUBLICATIONS

Chemical Abstracts, Vol. 54, Col. 4601z.
Elchardus et al., Genie Chimique, Vol. 93, No. 1, (January 1965), page 7.

Primary Examiner—John D. Welsh
Attorney—Ernest A. Polin and Jay P. Friedenson

[57] ABSTRACT

Trifluoromethane ($CHF_3$) and sulfur hexafluoride ($SF_6$), in certain proportions, form an azeotropic mixture and equivalent mixtures, which are especially adapted for use as refrigerants in high capacity, low temperature refrigeration systems.

10 Claims, No Drawings

NOVEL LOW BOILING COMPOSITIONS

BACKGROUND OF THE INVENTION

Sulfur hexafluoride ($SF_6$) is a known refrigerant (U.S. Pat. No. 1,778,033). The lower aliphatic hydrocarbons, when substituted by fluorine and chlorine, are well known to have potential as refrigerants (U.S. Pat. No. 1,968,049). Many of these halocarbon materials exhibit certain desired properties for refrigeration purposes including low cost, low specific volume, low toxicity and non-flammability, which characteristics have resulted in the extensive use of such compounds in a large number of refrigeration applications. Examples of such compounds include dichlorodifluoromethane ($CCl_2F_2$), b.p. $-21.6°$ F.; chlorodifluoromethane ($CHClF_2$), b.p. $-41.4°$ F.; fluorodichloromethane ($CHCl_2F$), b.p. $48.1°$ F.; fluorotrichloromethane ($CCl_3F$), b.p. $78.4°$ F., tetrafluorodichloroethane ($CClF_2CClF_2$), b.p. $38.4°$ F. and trifluoromethane ($CHF_3$), b.p. $-119.9°$ F.

While these chloro-fluoro derivatives provide an adequate range of refrigerants for many purposes, only a very few boil sufficiently low to offer any significant potential as low temperature refrigerants.

A large number of refrigerants of different boiling temperatures and capacities are required to permit flexibility of design and the art is continually faced with the problem of providing new refrigerants as the need arises for new capacities and types of installations.

It is well known that mixtures of substances having different boiling points result in a range of mixtures having boiling points intermediate the boiling points of the mixture components. On this basis it would be possible to mix two known refrigerants having different boiling points and obtain a complete series of compositions boiling at temperatures between those of the components.

The use of azeotropic mixtures and equivalent mixtures is also known in the art. Minimum boiling azeotropic mixtures and equivalent mixtures are advantageous for a number of reasons not the least of which is the fact that the boiling points of such mixtures are lower than the boiling point of either of the mixture components. Although technically, there is only one true azeotropic composition at a given set of conditions, in any azeotropic system there will be a range of mixtures which will be essentially equivalent to the true azeotropic mixture in the sense that they will boil at temperatures lower than the boiling point of the minimum boiling component of the mixtures and will, therefore, possess a higher refrigerating capacity than the minimum boiling component. This would not be possible in a non-azeotropic system.

Unfortunately, as is well known in this field, there has not yet been found by anyone a reliable basis for predicting the formation of azeotropes between any two compounds. As pointed out by Kvalnes in U.S. Pat. No. 3,085,065: "If an azeotrope occurs at all, its boiling point is a function of the system and is not under the control of the experimenter."

One commonly employed commercial method for producing low temperatures, say below about $-40°$ F., is the so-called cascade refrigeration system in which a series of refrigerant liquids of progressively lower boiling points are condensed under pressure at the temperature produced by the evaporation of the next higher boiling refrigerant liquid. Because of its low boiling point and other desirable properties, such systems commonly use chlorotrifluoromethane (b.p. $-72°$ F./45 psia) in the second of two stages. Trifluoromethane is a good substitute for chlorotrifluoromethane, having about the same boiling point ($-75.5°$ F./45 psia), and is even superior in a number of characteristics. In order to reach temperatures below the range of these refrigerants, however, tetrafluoromethane (b.p. $-166°$ F./45 psia), or equivalent, must be used and a third refrigeration stage added to the system. Ethane (b.p. $-85°$ F./45 psia) has been used to fill the gap between the levels of the former refrigerants, having boiling points of about $-76°$ F./45 psia, and the latter refrigerant, having a boiling point of about $-166°$ F./45 psia. Ethane, however is highly flammable, which is highly undesirable for many refrigeration applications and, accordingly, there is a need for a substitute refrigerant composition having a boiling point about equivalent to that of ethane, which refrigerant does not suffer from the considerable disadvantage of being flammable.

Accordingly, it is a major object of the present invention to provide new compositions especially suitable for use as low temperature refrigerants.

More particularly, it is an object of the invention to provide new refrigerants boiling lower and having greater capacity than the low boiling trifluoromethane.

A further object is to provide non-flammable low boiling refrigerant compositions having boiling points about equivalent to that of ethane.

Yet another object of the invention is to provide non-flammable, low boiling refrigerant compositions possessing many of the desirable refrigeration properties of ethane, such as high refrigeration capacities, low discharge temperatures and low power requirements.

Another object of the invention is to provide a novel azeotropic composition boiling at a temperature about equivalent to that of ethane, which composition is non-flammable and is particularly suited for use in a cascade refrigeration type system.

SUMMARY OF THE INVENTION

In accordance with the invention, it has been discovered that a mixture consisting of trifluoromethane ($CHF_3$) and sulfur hexafluoride ($SF_6$) containing about 22 mol percent $SF_6$ forms an azeotrope boiling at a temperature of about $-80°$ F./45 psia. It has further been found that mixtures comprising $CHF_3$ and $SF_6$ in which the $SF_6$ component is present in the range of about 1 mol percent (b.p. $-77.1°$ F./45 psia) and 35 mol percent (b.p. $-78.6°$ F./45 psia), other than the true azeotrope, are equivalent to the true azeotropic mixture for refrigeration purposes in that they boil at approximately the same temperature as the azeotrope. Mixtures as defined above in which the $SF_6$ component is present in a molar percentage between about 1–11 are additionally preferred, since they possess favorable freezing points below $-148°$ F. which is preferred for some refrigeration applications. Still preferred are mixtures as defined above in which the molar percentage of $SF_6$ is between about 5–11.

The novel refrigerant mixtures exhibit a number of advantages over the use of either $CHF_3$ or $SF_6$ alone as refrigerants. For example, the novel mixtures permit lower temperatures to be reached than are obtainable with either of the components alone and possess lower compression ratios and higher capacities than either of the components alone.

The mixtures of the invention may be employed to produce refrigeration in a conventional manner by condensing the mixtures and thereafter evaporating said mixtures in the vicinity of a body to be cooled.

The mixtures of the invention may also be employed for other applications such as for aerosol propellants, power cycle fluids, gaseous dielectric, heat transfer media and low temperature solvents.

EXAMPLE 1

Approximately equal molar proportions of $CHF_3$ and $SF_6$ were refluxed in a low temperature still at 45 psia. Reflux temperature was $-80°$ F., which is below the boiling point of either $CHF_3$ (b.p. $-72°$ F./45 psia) or $SF_6$ (b.p. $-46°$ F./45 psia) indicating the formation of a minimum boiling azeotrope. The portion of the material distilling at $-80°$ F. was collected; the remainder of the material in the still was discarded; the still was recharged with the collected sample and the sample was again refluxed. The refluxing temperature was unchanged at $-80°$ F. indicating that the azeotropic composition was reached. The azeotrope was determined to consist of about 22 mol percent $SF_6$ and 78 mol percent $CHF_3$.

I claim:

1. Low boiling mixtures consisting essentially of $CHF_3$ and $SF_6$ which possess boiling points lower than the boiling point of $CHF_3$.

2. Mixtures according to claim 1 in which the mol percent of $SF_6$ is in the range of about 1–35.

3. Mixtures according to claim 1 in which the mol percent of $SF_6$ is in the range of about 1–11.

4. Mixtures according to claim 1 in which the mol percent of $SF_6$ is in the range of about 5–11.

5. Mixtures according to claim 1 in which the mol percent of $SF_6$ is about 22.

6. The process of producing refrigeration which comprises condensing a mixture as defined in claim 1 and thereafter evaporating said mixture in the vicinity of a body to be cooled.

7. The process according to claim 6 in which the mixture is as defined in claim 2.

8. The process according to claim 6 in which the mixture is as defined in claim 3.

9. The process according to claim 6 in which the mixture is as defined in claim 4.

10. The process according to claim 6 in which the mixture is as defined in claim 5.

* * * * *